United States Patent [19]
Van Manen

[11] 3,777,454
[45] Dec. 11, 1973

[54] APPARATUS FOR SEALING PLASTIC CONTAINERS

[75] Inventor: Jacob Teunis Teunissen Van Manen, Johannesburg, South Africa

[73] Assignee: Conical Containers Company (Proprietary) Limited

[22] Filed: May 25, 1972

[21] Appl. No.: 256,903

[52] U.S. Cl. .................................. 53/373
[51] Int. Cl. ..................... B65b 7/06, B65b 51/10
[58] Field of Search ............................. 53/39, 373

[56] References Cited
UNITED STATES PATENTS
2,928,218   3/1960   Lecluyse ...................... 53/373 X
3,061,991   11/1962   Thulke ........................... 53/373
2,691,474   10/1954   Olson ........................... 53/373 X Primary Examiner—Travis S. McGehee
Attorney—Eric H. Waters et al.

[57] ABSTRACT

A method of and apparatus for sealing plastic containers having a pouring spout in which a heating element is moved along the longitudinal axis of the pouring spout to abut the edges of the pouring spout. The edges of all of the layers of material comprising the pouring spout are thus fused together. Ultimately the fused edges are flattened between suitable jaws and trimmed to provide a neat appearance.

4 Claims, 5 Drawing Figures

PATENTED DEC 11 1973                           3,777,454
SHEET 1 OF 2
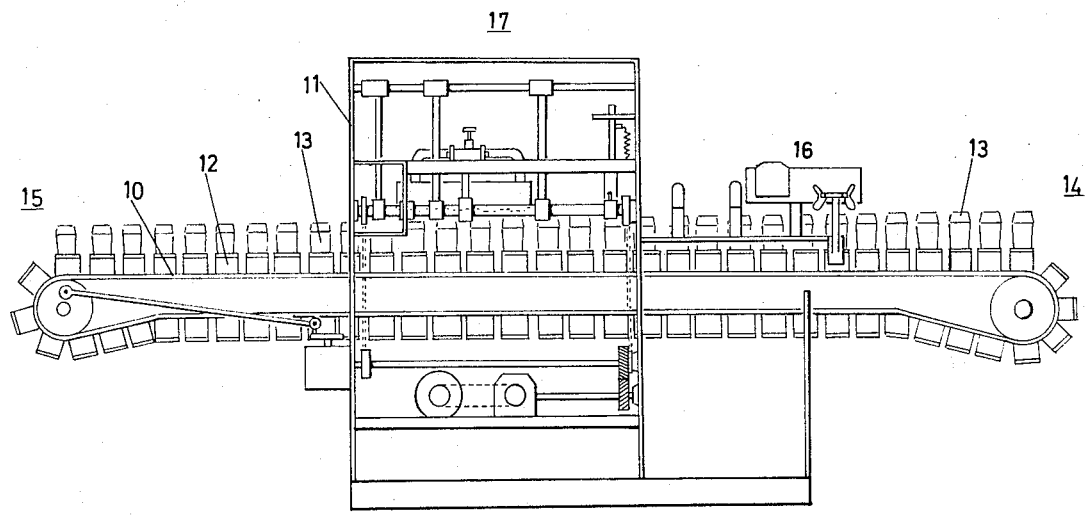
_Fig. 1_
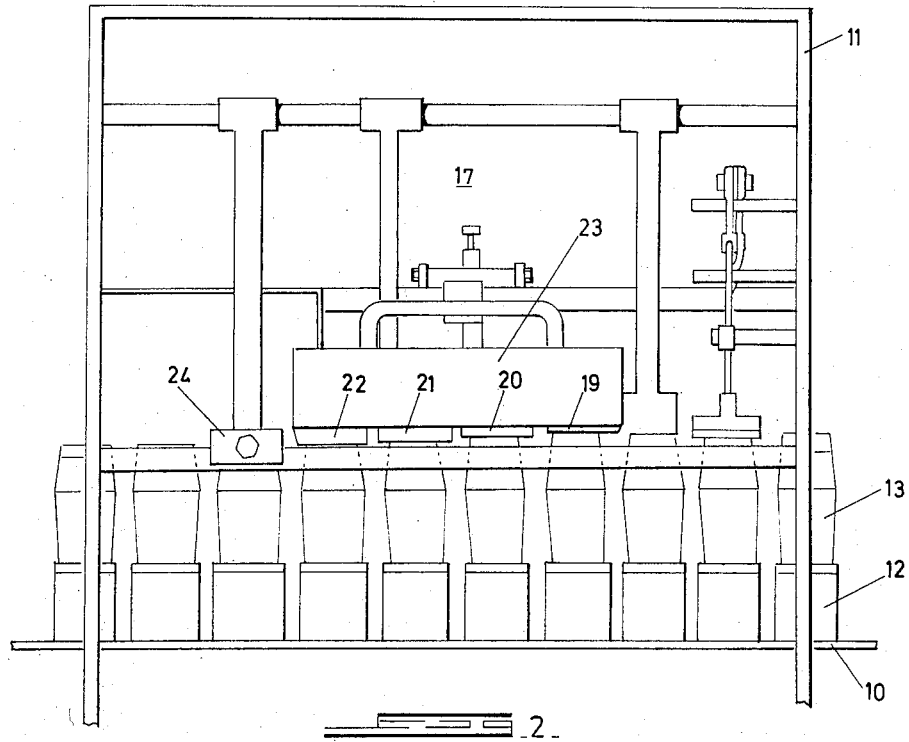
_Fig. 2_

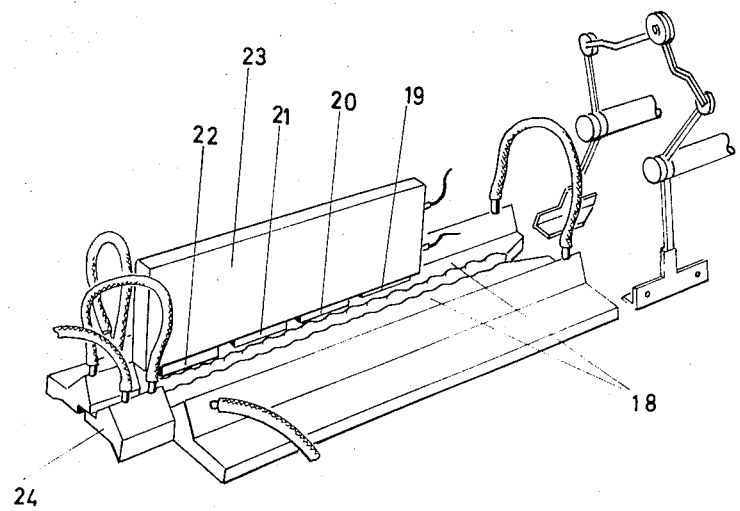
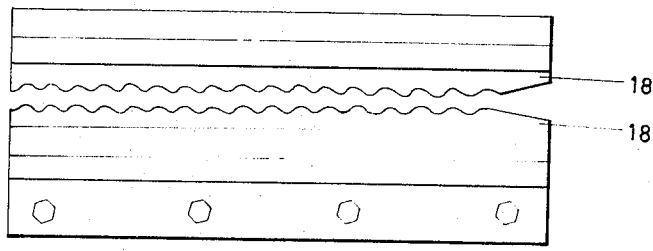
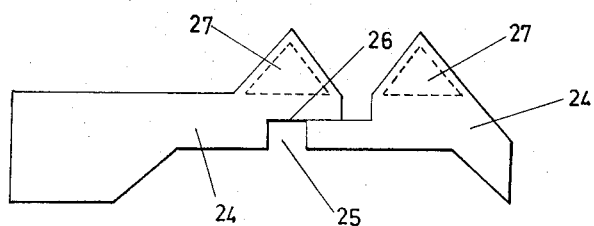

APPARATUS FOR SEALING PLASTIC CONTAINERS

This invention relates to the sealing of plastic containers.

The conventional plastic container has a pouring spout or neck which is in the shape of a tube having a circular, rectangular, square or other cross-section. The sealing of such a container presents few if any problems as only two layers of material have to be sealed together. The usual method of sealing such containers is simply therefore to clamp the neck of the container between two heated jaws which causes the plastic to melt partially thus causing the opposite sides of the neck to stick together.

A recent development in the field of plastic containers is however a container which has a gable upper end closure. In such a container at least four layers of plastic material (instead of two layers as in the conventional container) have to be sealed together. If sealing is attempted by the normal method, i.e., by applying heat and pressure to the sides of the neck, it will invariably be found that the seal is unsatisfactory in that some of the lyaers of material will not have stuck together or that the outer layers will have been completely melted away.

It is an object of the present invention to provide an improved method of sealing plastic containers having a pouring spout.

It is a further object of the invention to provide apparatus for carrying out the method.

A method according to the invention includes the steps of moving a heating element along the longitudinal axis of the pouring spout and towards the edges of the pouring spout, melting the edges of the pouring spout with the heating element until the edges of all of the layers of material comprising the pouring spout are fused together, and clamping the fused edges of the pouring spout between suitable jaws.

Further according to the invention the temperature of the heating element is higher than the melting point of the plastic material from which the container and pouring spout are formed.

Apparatus according to the invention comprises a conveyor adapted to carry containers from a first station to a second station and from there to a third station, the containers being loaded onto the conveyor at the first station, at least one pair of jaws at the second station for clamping between them the pouring spout of a container arriving at the second station, at least one heating element adapted for movement between a first position in which it is above the upper edges of the pouring spout of a container at the second station and a second position in which it is in contact with the upper edges of the pouring spout, the upper edges thereby being fused together, and a second pair of jaws at the third station between which the fused upper edges of the pouring spout are compressed.

Further according to the invention the conveyor is adapted to carry the containers from the first heating element at the second station to at least a second heating element at the second station, the second heating element operating in exactly the same manner as the first heating element except that it is adapted to project slightly further downwards in its second position than the first heating element.

Further according to the invention the inner surfaces of the jaws at the second station are corrugated.

Further according to the invention the lower surface of the first heating element is serrated.

Further according to the invention the lower surface of the second heating element is serrated.

To illustrate the invention an embodiment thereof is described hereunder with reference to the accompanying drawings in which:

FIG. 1 is a side view of the apparatus of the invention;

FIG. 2 is an enlarged side view of the heating and clamping section of the apparatus;

FIG. 3 shows an even further enlarged isometric view of the heating and clamping section of the apparatus;

FIG. 4 is a plan view of the jaws which are used to clamp the pouring spouts of the containers during heating; and FIG. 5 is a side view of the jaws which are used to compress the fused upper edges of the pouring spouts.

With reference to the drawings an endless conveyor 10 is mounted on a frame 11. The conveyor 10 is provided with a plurality of sockets 12 each of which is adapted to receive a plastic container 13 to be sealed.

The containers 13 are positioned in the sockets 12 at the end 14 of the conveyor. The conveyor is adapted to carry the containers away from the end 14 to the opposite end 15. The movement of the conveyor is intermittent.

Once they have been located on the conveyor the containers are advanced by the conveyor until a filling and pre-folding stage 16 is reached. Here the containers are filled with whatever substance (for example, milk) they are required to contain. Thereafter the pouring spout of the container is prefolded to facilitate sealing.

Sealing of the pouring spouts of the containers takes place at the stage 17 which is illustrated in more detail in FIGS. 2 and 3.

To facilitate explanation the movement of one particular container through the sealing stage 17 will now be described.

On reaching the sealing stage 17 the container will have been filled and its pouring spout will have been pre-folded. As it enters the sealing stage the pouring spout of the container will enter between two open gripping jaws the gripping surfaces of which are corrugated (see FIG. 3). On each pause of the container during its intermittent movement the jaws 18 will close, clamping the pouring spout of the container between them. Thereafter the jaws open again and the containers are advanced another step.

Eventually the container will be immediately below the first of four heating elements 19 to 22 which are mounted on the lower surface of a carrier 23. During the pause of the container below the heating element 19 the jaws 18 will again close to clamp the pouring spout between them. Immediately thereafter the carrier 23 will descend and the heating element 19 will be brought down onto the upper edges of the pouring spout.

This results in the upper edges of the pouring spout of the container being melted thus causing the upper edges of all of the layers of material comprising the spout to be fused into a single mass. The lower surfaces of the heating elements 19 to 22 are preferably serrated to enhance the melting efficiency. The heating elements are also preferably heated to a temperature in excess of the melting point of the plastic material from which the containers are made. With high density polyethylene the temperature of the heating elements would thus be between 250° and 300° Centigrade.

Immediately prior to the next step of the container the jaws 18 are again opened, and the carrier 23 is raised to lift the heating element 19 clear of the pouring spout. The container now moves until it is immediately below the second heating element 20. During its pause the jaws 18 again close and the carrier descends to enable the heating element 20 to be brought down onto the already melted upper edges of the pouring spout. It will however be noticed in FIGS. 2 and 3 that the second heating element 20 projects slightly further downwards than the first heating element, the third heating element 21 projects slightly further downwards than the second heating element and so on. Thus, as the container moves through the sealing stage, a deeper and deeper portion of the pouring spout will be melted from the top downwards.

Eventually, on emerging from the fourth heating element 22, the upper edges of the pouring spout will be one homogeneous molten mass of plastic. The container is then advanced until its pouring spout enters between a second pair of jaws 24. On the pause of the container at this point, the jaws 24 close and thus flatten the molten mass of plastic at the upper end of the pouring spout. At the same time the uppermost edge of the flattened portion is trimmed off to present a neat appearance. This could be effected in a variety of ways and one example thereof is illustrated in FIGS. 3 and 5. The pouring spout enters the opening 25 between the two jaws 24 and, when the jaws close, the uppermost edge of the pouring spout will be trimmed by the horizontal flat 26 on the left hand jaw 24.

The jaws 24 are preferably cooled by means of cold water passages 27.

To facilitate the flattening of the melted portion of the pouring spout (particularly where the pouring spout consists of more than four layers of material) a strip of resilient material such as rubber could be mounted on one of the faces of the jaws 24.

This completes the sealing and the container is now ready for packaging and despatch.

I claim:

1. Apparatus for sealing plastic containers having a pouring spout, comprising a conveyor adapted to carry containers from a first station to a second station and from there to a third station, the containers being loaded onto the conveyor at the first station, at least one paid of jaws at the second station for clamping between them the pouring spout of a container arriving at the second station, at least one heating element adapted for movement between a first position in which it is above the upper edges of the pouring spout of a container at the second station and a second position in which it is in contact with the upper edges of the pouring spout, the upper edges thereby being fused together, and a second pair of jaws at the third station between which the fused upper edges of the pouring spout are compressed, the improvement of adapting the conveyor to carry the containers from the first heating element at the second station to at least a second heating element at the second station, the second heating element operating in exactly the same manner as the first heating element except that it is adapted to project slightly further downwards in its second position than the first heating element.

2. Apparatus as claimed in claim 1 in which the inner surfaces of the jaws at the second station are corrugated.

3. Apparatus as claimed in claim 1 in which the lower surface of the first heating element is serrated.

4. Apparatus as claimed in claim 1 in which the lower surface of the second heating element is serrated.

* * * * *